F. O. BOSWELL.
VEHICLE SUSPENSION AND SHOCK ABSORBER.
APPLICATION FILED MAY 25, 1917.
1,261,099.
Patented Apr. 2, 1918.
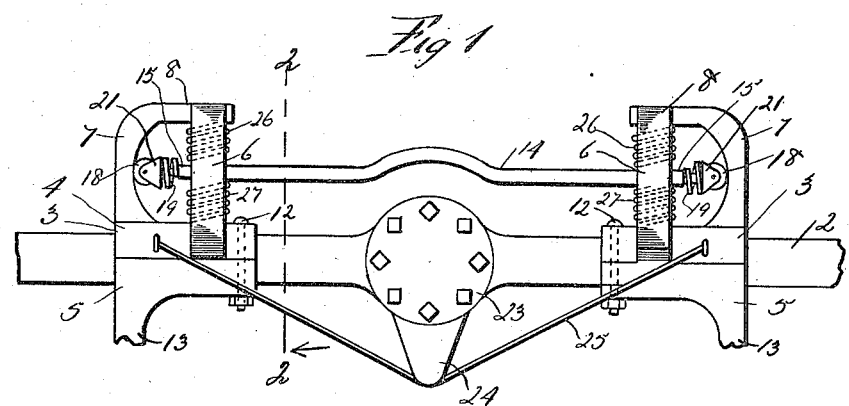
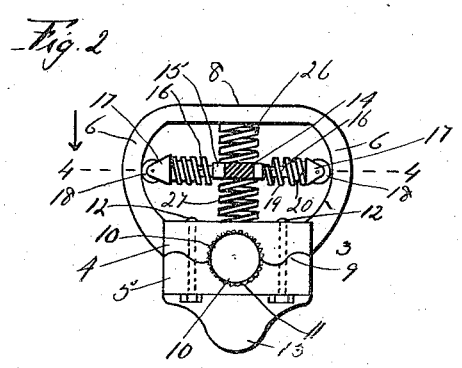
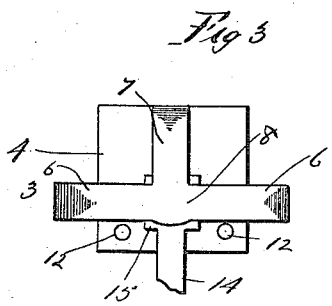
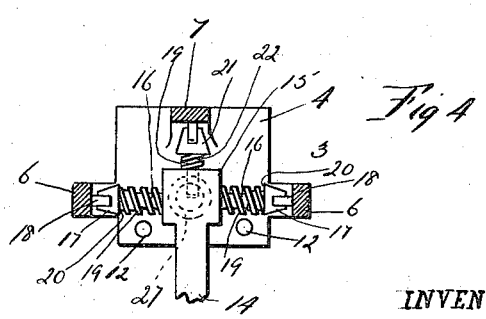
INVENTOR
Fletcher O. Boswell
By W. W. Williamson
Atty.

UNITED STATES PATENT OFFICE.

FLETCHER O. BOSWELL, OF PHILADELPHIA, PENNSYLVANIA, ASSIGNOR TO F. O. B. MANUFACTURING COMPANY, OF PHILADELPHIA, PENNSYLVANIA, A CORPORATION OF DELAWARE.

VEHICLE SUSPENSION AND SHOCK-ABSORBER.

1,261,099.	Specification of Letters Patent.	Patented Apr. 2, 1918.

Original application filed May 23, 1916, Serial No. 99,270. Patent No. 1,228,644, dated June 5, 1917. Divided and this application filed May 25, 1917. Serial No. 170,839.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Suspensions and Shock-Absorbers, of which the following is a specification.

My invention relates to new and useful improvements in vehicle suspensions and shock absorbers, the same being a division of application Ser. No. 99,270, filed May 23, 1916, which has matured into Patent No. 1,228,644, dated June 5, 1917, and has for its object to provide an exceedingly simple and effective device of this character whereby a vehicle body may be mounted upon a chassis or running gear without the use of the ordinary springs and which will absorb the shocks incident to obstructions upon the roadway to prevent their transmission to the vehicle body or the occupants thereof.

A further object of the invention is to provide a device of the character stated which may be readily and quickly applied to old vehicles which have been using some other form of suspension device.

A still further object of the invention is to provide a number of arcuate tracks or runways in the form of brackets which may be readily and quickly applied to a stationary axle, the casing of an axle or the cross members of a running gear frame or chassis, said arcuate tracks or runways being arranged in pairs and having a body supporting or cross rod coacting therewith, said rod having a number of springs at each end in order to take up the shock and evenly distribute the load in the vehicle to prevent undue swinging or jolting.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a view in elevation of my improved vehicle suspension and shock absorber, showing it applied to the rear axle of a vehicle.

Fig. 2, is a section at the line 2—2 of Fig. 1, looking in the direction of the arrow with the axle removed.

Fig. 3, is a plan view thereof, and

Fig. 4 is a section at the line 4—4 of Fig. 2 looking in the direction of the arrow.

In carrying out my invention as herein embodied 2 represents an axle or other suitable supporting part of a vehicle running gear and may be the casing inclosing the rear axle as here illustrated or it may be a stationary axle or the cross member of the vehicle frame or chassis. On this supporting member are mounted a pair of coacting brackets 3, each comprising a base member 4 and a clamp 5. The base member 4 is provided with a number of integral upwardly projecting arcuate tracks or runways 6 and 7 preferably three in number, two of which such as those numbered 6 are diametrically opposite while the other 7 is at right angles thereto, and the upper ends of all of these tracks or runways are connected together by an integral cross piece 8. The meeting faces of the base member and clamp are each preferably corrugated longitudinally thereof as at 9, so that the concave portion of one will register with the convex portion of the other, and said base members are further provided with an axle engaging chamber 10, and when these chambers are each semicircular in cross section, so as to be used upon a round supporting member or axle, they are provided with serrations 11 to prevent accidental displacement of the members and said chambers 10 when coacting will form a circle in cross section as plainly shown in Fig. 2.

The base member and clamp each partially surround the axle or supporting member and are secured together by means of bolts 12 or their equivalent. If found desirable, the clamps may be provided with depending extensions 13 whereby torsion wires may be used for strengthening the parts and properly supporting them in their positions.

Between the two bracket members mounted upon the same axle or supporting member is arranged a body supporting or cross rod 14, having an enlargement 15 at each end thereof and from two opposite sides thereof project thrust head supports or trunnions 16 on which are slidably mounted the thrust heads 17, each carrying a roller 18, and said thrust heads are normally forced out by springs 19 coiled about the thrust head supports or trunnions and engaging the shoulder 20, formed by the different diameters of the thrust head and the body supporting or cross head. The third thrust head designated by the reference numeral 21 is provided with a neck 22, which is slidably mounted in the end of the body supporting or cross rod, the same being forced outward in the same manner as the other thrust heads.

The oppositely projecting thrust heads 17 coact with the arcuate tracks 6, while the other thrust head 21 coacts with the arcuate track 7.

Where the device is to be used upon the casing of the rear axle of an automobile, the cover 23 of the gear casing is provided with a depending extension 24 over which passes the torsion wire 25, the ends thereof being fastened to the brackets in any suitable manner.

Any movement of either or both ends of the body supporting or cross rod 14 will force all of the thrust heads inward against the action of their springs, so as to absorb any shocks, and in addition to these spring actuated thrust heads, I provide a pair of upper and lower springs 26 and 27 respectively at each end of the body supporting or cross rod 14, one engaging the under side of the rod, and the other the upper side thereof, while the opposite ends of said springs engage suitable portions of the face member and upper ends of the tracks, such as the cross piece 8.

Of course, I do not wish to be limited to the exact details of construction as herein shown, as these may be varied within the limits of the appended claims without departing from the spirit of my invention.

Having thus fully described my invention, what I claim as new and patentable is—

1. In combination with the axle of a vehicle, a pair of members detachably secured to the axle, each member having a plurality of arcuate tracks, a body supporting bar situated between said members, and carrying compressible means for engaging the tracks, and resilient means for normally holding the body supporting bar in a central position.

2. In combination with the axle of a vehicle, a pair of members detachably secured to the axle, each member having three integral tracks, two of which are arranged diametrically opposite each other and the other is situated at right angles to the two, a body supporting bar, and a plurality of thrust heads carried by each end of the body supporting bar, and engaging the arcuate tracks for cushioning and vertical movement of said bar.

3. In combination with the axle of a vehicle, a pair of members detachably secured to the axle, each member having three integral tracks, two of which are arranged diametrically opposite each other and the other is suitated at right angles to the two, a body supporting bar, a plurality of thrust heads slidably mounted at each end of the body supporting bar, a roller carried by each thrust head for engaging an arcuate track, springs for normally forcing said thrust heads outward, and springs engaging the upper and lower faces of the body supporting bar for normally holding the same in a central position.

4. In combination with the axle of a vehicle, a pair of members detachably secured to the axle, each member having three integral tracks, two of which are arranged diametrically opposite each other and the other is situated at right angles to the two, a body supporting bar, a plurality of thrust heads slidably mounted at each end of the body supporting bar, a roller carried by each thrust head for engaging an arcuate track, springs for normally forcing said thrust heads outward, a spring mounted between the lower portion of each track member and the underface of the body supporting bar at each end thereof, another spring mounted between the upper portion of each track member and the upper face of the body supporting bar at each end thereof, a downwardly projecting lug formed with the cover of the casing and carried by the axle and a torsion wire passing over said lug and attached to the track members.

In testimony whereof, I have hereunto affixed my signature.

FLETCHER O. BOSWELL.